United States Patent [19]
Williams

[11] 4,370,854
[45] Feb. 1, 1983

[54] FUEL VALVE

[75] Inventor: Raymond L. Williams, Evendale, Ohio

[73] Assignee: The United States of America as represented by the Secretary of the Air Force, Washington, D.C.

[21] Appl. No.: 187,646

[22] Filed: Sep. 16, 1980

[51] Int. Cl.³ .............................................. F02K 3/10
[52] U.S. Cl. ..................... 60/261; 137/538; 251/368
[58] Field of Search ............. 60/261; 251/368; 137/538, 540

[56] References Cited

U.S. PATENT DOCUMENTS

| | | | |
|---|---|---|---|
| 2,655,173 | 10/1953 | Overbeke | 137/538 |
| 2,896,662 | 7/1959 | Thomas | 137/538 |
| 3,757,816 | 9/1973 | Price | 251/368 |
| 3,793,838 | 2/1974 | Nash | 60/261 |
| 4,161,187 | 7/1979 | Bauer | 251/368 |
| 4,312,185 | 1/1982 | Nash et al. | 60/261 |

*Primary Examiner*—Louis J. Casaregola
*Attorney, Agent, or Firm*—Donald J. Singer; Arsen Tashjian

[57] ABSTRACT

A valve assembly for controlling the flow of a liquid fuel. The assembly includes a spring-biased movable valve member made of tungsten carbide, a captured sleeve member also made of tungsten carbide, and a readily accessible filtering screen member disposed in the fuel duct inlet of the assembly. In assembled form, the housing comprises two releasably connected constituent portions which integrate to form a one-piece unit. The structure of the unit, and the extreme hardness of the tungsten carbide material of which the valve member and the sleeve member are made, prevent corrosion and/or galling (such as by sand particles) and/or other normally-expected wear of the valve assembly, and thereby result in continued accuracy and reliability of the valve assembly, while maintaining simplicity and compactness of it. A plurality of these valve assemblies can be effectively and economically used in combination with, and intermediate of, the fuel manifold and the fuel spraybars of the afterburner of a gas turbine engine, to keep the manifold full when not operating and to effectuate equal distribution of a given flow of fuel to all spraybars throughout the fuel flow range.

16 Claims, 5 Drawing Figures

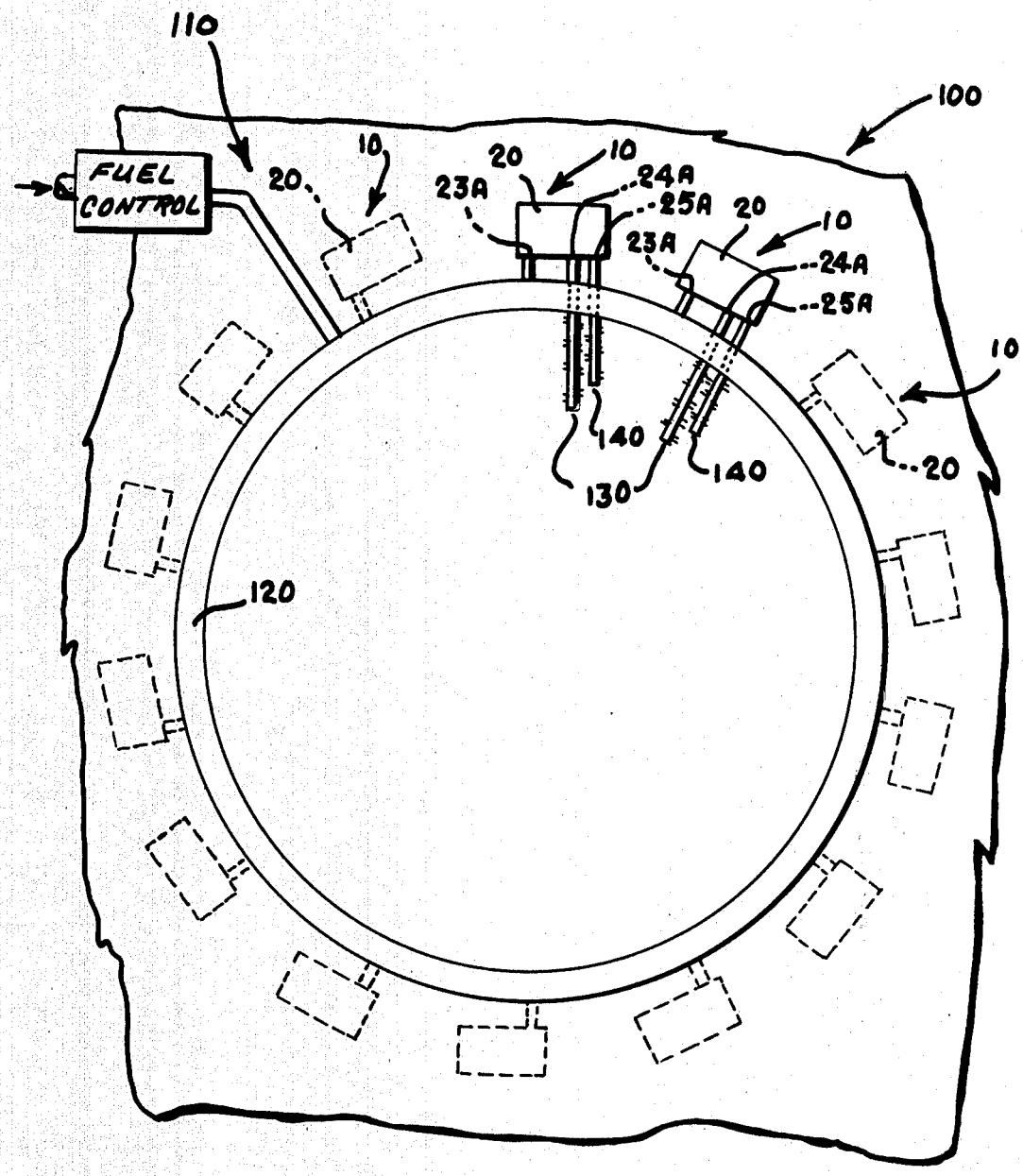

4,370,854

FUEL VALVE

STATEMENT OF GOVERNMENT INTEREST

The invention described herein may be manufactured and used by or for the Government for governmental purposes without the payment of any royalty thereon.

BACKGROUND OF THE INVENTION

This invention relates to a valve assembly for a liquid fuel and, more particularly, a fuel valve assembly which is ideally suited for use in combination with the spraybars of an afterburner of a gas turbine engine.

Augmented (i.e., afterburner-equipped) gas turbine engines require spraybar valve assemblies between the fuel manifold and the spraybars. The principal need for these valve assemblies is to create equal distribution of a given flow of liquid fuel to all spraybars of the manifold throughout the fuel flow range, because without such valve assemblies the scheduled flow would become unevenly distributed in the burner section of the engine, with significantly adverse results, as the flow decreases to the lower end of its range.

Although fuel flow control valve assemblies in afterburners are well known, there is a current need in the art for a valve assembly which will eliminate the probability of corrosion and/or galling that afflicts prior art valve assemblies of this type, and thereby which will eliminate the significantly adverse results thereof, such as the consequent inaccuracy of the valve assembly because of hysteresis and sticking. Currently used valve assemblies commonly have valve members and sleeve members that are made of materials which will rust and gall and otherwise wear during some operating conditions of the engine, such as with some sand and/or water and/or salts in the liquid fuel.

I have invented a unique valve assembly which can be used to meet the above-described current need in the art; and, thereby, I have advanced the state-of-the-art.

SUMMARY OF THE INVENTION

This invention is a spring-biased valve assembly that will not corrode, gall, or otherwise wear, and that is for use in selectively controlling a flow of liquid fuel. The valve assembly, in its preferred embodiment, is eminently suitable for use in a gas turbine engine to keep the fuel manifold of the afterburner full when not operating, and to effectuate equal distribution of the fuel flow to a plurality of spraybars in the afterburner section.

Accordingly, the principal object of this invention is to teach the structure of the preferred embodiment of the above-described valve assembly, wherein the simplicity of the structural form of the housing of the assembly enables the use of tunsten carbide for the housing, which material would not otherwise be useable in this assembly, and which is not useable in prior art valve assemblies because of their complex structural form.

This principal object, as well as other related objects, (e.g., reliability, simplicity, and compactness), of this invention will become readily apparent after a consideration of the description of the invention, together with reference to the Figures of the drawing.

DESCRIPTION OF THE DRAWING

FIG. 5 is a representation, in simplified form and partially fragmented, of a plurality of the inventive valve assemblies in a typical working environment, i.e., in use with a fuel manifold and fuel spraybars of a gas turbine engine, as seen while looking in a fore-to-aft direction.

DESCRIPTION OF THE PREFERRED EMBODIMENT

With reference to FIGS. 1-5, inclusive, therein is shown in diverse views the preferred embodiment 10 of my inventive valve assembly for use in selectively controlling the flow of a liquid fuel (hereinafter referred to sometimes as the "liquid fuel valve assembly").

Figure 3:
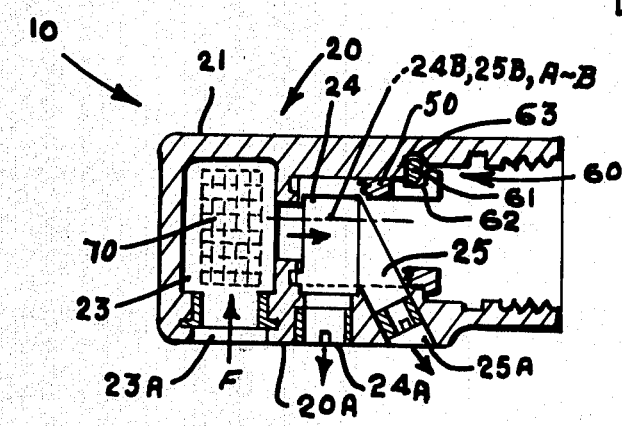
FIG. 3 is side elevation view, in simplified schematic and pictorial form, partially in cross section and partially fragmented, of the preferred embodiment.

In its most basic and generic structural form, the liquid fuel valve assembly 10 comprises: a housing 20 made of a high temperature resistant material, and having a first constituent portion 21, a second constituent portion 22, a fuel inlet duct 23 in the first constituent portion 21 with the duct 23 having an inlet 23A, a first liquid fuel discharge duct 24 in the first constituent portion 21 with this duct 24 having a first discharge outlet 24A, and a second liquid fuel discharge duct 25 in the first constituent portion 21 with this duct 25 having a second discharge outlet 25A; and, a liquid fuel valve subassembly means 30 for selectively controlling a flow of liquid fuel, such as F, FIG. 3, in the housing 20 between the inlet 23A and the first and second discharge outlets 24A and 25A.

It is here to be noted: that the first and second discharge ducts 24 and 25 of the housing 20 comprise spiral or spiral-like voids in the first constituent portion 21 of the housing 20, with the voids 24 and 25 (best seen in FIG. 2) having respective origins 24B and 25B on a common axis, A-B, and with the voids 24 and 25 having respective terminuses 24A and 25A which constitute the respective outlets 24A and 25A of the discharge ducts 24 and 25; and, that the first constituent portion 21 of the housing 20 has a bottom surface 20A (best seen in FIG. 4) in which are located the first and second discharge duct outlets 24A and 25A.

Figure 1:
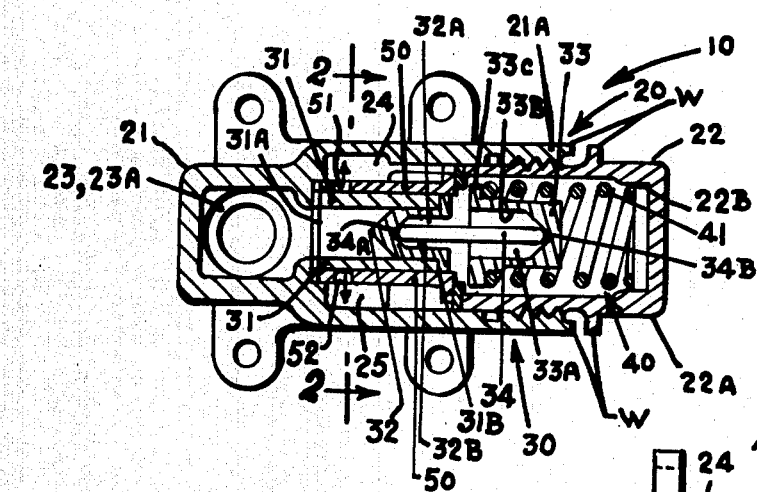
FIG. 1 is a top plan view, in simplified schematic and pictorial form, partially in cross section, of the preferred embodiment of the invention.
Figure 2:
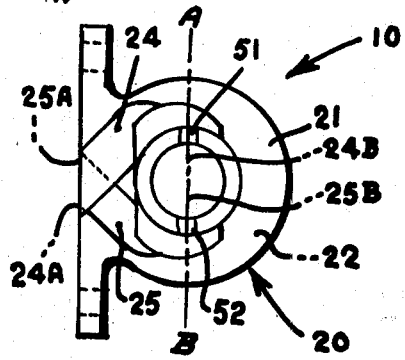
FIG. 2 is an end view, in simplified schematic and pictorial form, of the preferred embodiment as seen when viewed along line 2—2 of FIG. 1.

The liquid fuel valve subassembly means 30 (best seen in FIG. 1) includes: a valve member 31 which is in the shape of a hollow circular cylinder having a first open end 31A and an second open end 31B, and which is disposed adjacent to the inlet 23A of the fuel inlet duct 23 and across from the discharge outlets 24A and 25A of the first and second discharge ducts 21 and 25; a first retainer member 32 having a cavity 32A therein with a surface 32B and an apex, with this member 32 disposed over, fitted into, and connected to the second open end 31B of the valve member 31, thereby closing that end 31B; a second retainer member 33 having a cavity 33A therein with a surface 33B and an apex, with this member 33 disposed such that it is in alignment with the first retainer member 32 and also disposed such that the cavity 33A of this member 33 faces the cavity 32A in the first retainer member 32; a rod 34 having a first end 34A and a second end 34B, with the first end 34A disposed in the cavity 32A of the first retainer member 32 and in contact with the apex of the surface 32B of this cavity 32A, and with the second end 34B disposed in the cavity 33A of the second retainer member 33 and in contact with the apex of the surface 33B of this cavity 33A; means, generally designated 40, for biasing the second retainer member 33 toward the first retainer member 32, with this means 40 disposed within the second constituent portion 22 of the housing 20; a rotatable, hollow, cylinder-like sleeve member 50 having a first opening 51 and a second opening 52 therein, with this sleeve member 50 disposed adjacent to and in contact with the valve member 31, and with this sleeve member 50 concurrently disposed such that the first opening 51 is in communication with the first discharge outlet duct 24 and its outlet 24A, and also such that the second opening 52 is in communication with the second discharge outlet duct 25 and its outlet 25A, and further such that the first and second openings 51 and 52 are covered and are thereby closed when the valve member 31 is in the closed position, as is shown in FIG. 1; and, means (generally designated 60) for preventing the rotatable sleeve member 50 from rotating (best seen in FIG. 3), with this means 60 including a ball member 61 that is captured in, and between, a slot 62 in the sleeve member 50 and an opening 63 in the housing 20.

The valve member 31 and the sleeve member 50 are made of material which is resistant to rust and to galling and to general wear, and preferably are made of tungsten carbide.

The means 40 for biasing the second retainer member 33 toward the first retainer member 32 includes a spring member 41 that is disposed within the second constituent portion 22 of the housing 20.

As a matter of preference, the second constituent portion 22 of the housing 20 is threadedly engaged with, and thereby is releasably connected to, the first constituent portion 21 of the housing 20.

Also, and with reference to the spring member 41 of the biasing means 40, as a matter of preference this member 41 is coiled around the second retainer member 33 and is disposed between and is in contact with a flange 33C of the second retainer member 33 and an internal surface 22B of the second constituent member 22 of the housing 20.

Figure 4:
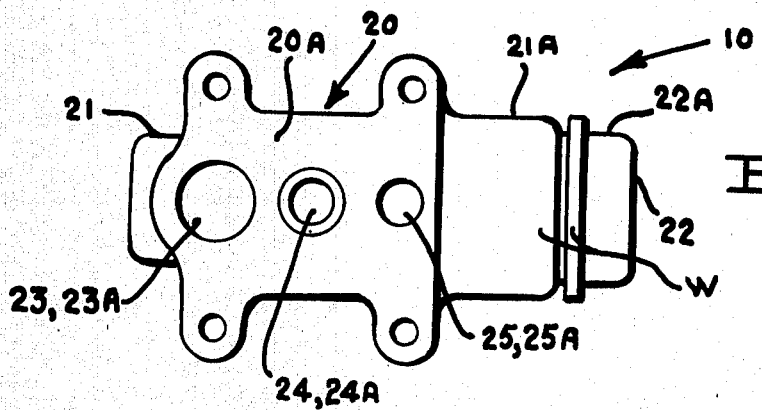
FIG. 4 is a bottom view in simplified form, of the preferred embodiment.

Additionally, and with reference to the housing 20, the first and second constituent portions 21 and 22 of the housing 20 each has, respectively, an outer surface 21A and 22A, with these outer surfaces 21A and 22A configurated such that, when these constituent portions 21 and 22 are releasably connected (such as best seen in FIGS. 1 and 4), the surfaces form on the housing 20 a structurally defined area (designated "W") which is weldable, whereby if the surfaces are welded at this area, then the housing becomes an integrated one-piece unit, and redundantly leak proof.

Further, and with reference to the liquid fuel valve subassembly means 30, this means 30 also includes a filtering screen member 70 that is disposed in the inlet 24A of the fuel inlet duct 24.

With reference to FIG. 5, and as previously stated, it is to be remembered that a plurality of my inventive liquid fuel valve assemblies (each of which is similarly referenced 10) is ideally suited for use in combination with a gas turbine engine 100 having an afterburner fuel spray means 110 which includes a liquid fuel manifold 120, a first plurality of spraybars 130, and a second plurality of spraybars 140.

Because each liquid fuel valve assembly 10 of the plurality is identical, and because the preferred embodiment 10 of said liquid fuel valve assembly has been described and shown herein already, it is not deemed necessary to describe the structure of the fuel valve assembly 10 again.

As shown in FIG. 5, each valve assembly 10 of the plurality is disposed within the engine 100 and is operatively connected to the liquid fuel manifold 120 at the inlet 23A of the housing 20, and one spraybar of the first plurality 130 is operatively connected to the first discharge outlet 24A of the housing 20, and one spraybar of the second plurality of 140 is operatively connected to the second discharge outlet 25A of the housing 20.

MANNER OF OPERATION OF THE PREFERRED EMBODIMENT

The manner of operation of the preferred embodiment 10 of my inventive liquid fuel valve asembly per se, and also in its adaptation for use in combination with a gas turbine engine after burner liquid fuel spray means 110 of FIG. 5, can be easily ascertained by any person of ordinary skill in the art from the foregoing description, coupled with reference to the contents of the Figures of the drawing.

For others, the following simplified explanation is given: When the liquid fuel F is permitted to flow from the source (such as manifold 120, FIG. 5) the fuel F enters the housing 20 through the inlet 23A, flows through the inlet duct 23, and moves the first retainer member 32 (because of the force and pressure of the flow) toward the reader's right. As a result, the valve member 31 which is connected to the first retainer member 31 is moved toward the reader's right, uncovering the first and second openings 51 and 52 in the sleeve member 50 which remains stationary, and also moving the rod 34 and the second retainer member 33 toward the reader's right, and thereby compressing the captured spring member 41. Then, the liquid fuel F flows through the sleeve openings 51 and 52, into and through, respectively, first and second discharge ducts 24 and 25, and out of first outlet 24A of duct 24 and out of second outlet 25A of duct 25. If the valve assembly 10 is used as shown in FIG. 5, then the exiting fuel F enters spraybar 130 from outlet 24A and spraybar 140 from outlet 25A, and is emitted from the spraybars. Whether the valve assemblies are used as shown in FIG. 5 or not, the flow of the fuel F from the assembly 10 ends when the flow to the assembly 10 is stopped by suitable conventional means, such as the fuel control shown in FIG. 5.

It is to be noted that if, as preferred, the valve member 31 and the sleeve member 50 are made of tungsten carbide, then one should remember this material is extremely hard (e.g., harder than sand) and that it is also highly corrosion resistant.

It is also to be noted that, if, as preferred, a filtering screen member 70 is used, then before any foreign material can get to the valve member 31 or to the sleeve member 50, said foreign material must get through the filtering screen member 70 which, if properly sized as to interstices, will most probably stop any foreign material which can be reasonably forseen as being in the fuel F. In this regard, it is further to be noted (as can be seen in FIG. 3) that the filtering screen member 70 is easily accessible for removal for cleaning, replacement, and the like.

CONCLUSION

It is abundantly clear from all of the foregoing, and from the contents of the Figures of the drawing that the stated principal object of my invention 10, as well as other related objects of the invention 10, have been achieved.

It is to be noted that, although there have been described and shown the fundamental and unique features of my invention 10 as applied to a preferred embodiment and to a particular adaptation, various other embodiments, adaptations, variations, substitutions, additions, omissions, and the like may occur to, and can be made by, those of ordinary skill in the art, without departing from the spirit of my invention 10.

What is claimed is:

1. A liquid fuel valve assembly, comprising:
   a. a housing made of high temperature resistant material and having a first constituent portion with a bottom surface, a second constituent portion releasably connected to said first constituent portion, a fuel inlet duct in said first constituent portion with said duct having an inlet, a first liquid fuel discharge duct in said first constituent portion with this duct having a first discharge duct outlet, and a second liquid fuel discharge duct in said first constituent portion with this duct having a second discharge duct outlet, with said first and second discharge duct outlets being located in said bottom surface of said first constituent portion, wherein said first and second discharge ducts of said housing comprise spiral-like voids in said first constituent portion of said housing, with said voids having respective origins on a common axis, and with said voids having separated respective terminuses which constitute said outlets of said discharge ducts; and
   b. a liquid fuel valve subassembly means for selectively controlling a flow of liquid fuel, in said housing, between said inlet of said housing and said first and second discharge duct outlets in said housing.

2. A plurality of identical liquid fuel valve assemblies, in combination with a gas turbine engine having an afterburner liquid fuel spray means which includes a liquid fuel manifold, a first plurality of spraybars, and a second plurality of sprayers, wherein each liquid fuel valve assembly of said plurality comprises:
   a. a housing made of high temperature resistant material and having a first constituent portion with a bottom surface, a second constituent portion releasably connected to said first constituent portion by threaded engagement therewith, a fuel inlet duct in said first constituent portion with said duct having an inlet, a first liquid fuel discharge duct in said first constituent portion with this duct having a first discharge duct outlet, and a second liquid fuel discharge duct in said first constituent portion with this duct having a second discharge duct outlet, with said first and second discharge duct outlets being located in said bottom surface of said first constituent portion, and with said first and second discharge ducts of said housing comprising spiral-like voids in said first constituent portion of said housing, with said voids having respective origins on a common axis and also having separated respective terminuses which constitute said outlets of said discharge ducts, wherein said housing is disposed within said engine and is operatively connected to said liquid fuel manifold at said inlet of said housing, and wherein one spraybar of said first plurality thereof is operatively connected to said first discharge outlet of said housing and one spraybar of said second plurality thereof is operatively connected to said second discharge outlet of said housing, and also wherein said first and second constituent portions of said housing each have an outer surface, with said outer surfaces configurated such that, when said constituent portions are releasably connected, then said surfaces form on each housing a structurally defined area which is weldable, whereby if said surfaces are welded, each said housing becomes an integrated one-piece unit; and
   b. a liquid fuel valve subassembly means for selectively controlling a flow of liquid fuel, in said housing, between said inlet of said housing and said first and second discharge duct outlets in said housing.

3. A liquid fuel valve assembly, as set forth in claim 1, wherein said liquid fuel valve subassembly means includes:
   a. a valve member in the shape of a hollow right circular cylinder having a first open end and a second open end, wherein said valve member is disposed adjacent said inlet of said fuel inlet duct and across from said discharge outlets of said first and second discharge ducts;
   b. a first retainer member having a cavity therein with a surface, with this member disposed over, fitted into, and connected to said second open end of said valve member, thereby closing said end;
   c. a second retainer member having a cavity therein with a surface, with this member disposed such that it is in alignment with said first retainer member and also such that said cavity in this member faces said cavity in said first retainer member;
   d. a rod having a first and a second end, with said first end disposed in said cavity of said first retainer member and in contact with said surface of this cavity, and with said second end disposed in said cavity of said second retainer member and in contact with said surface of this cavity;
   e. means for biasing said second retainer member toward said first retainer member, with this means disposed within said second constituent portion of said housing;
   f. a rotatable hollow, cylinder-like sleeve member having a first opening and a second opening therein, with said sleeve member disposed adjacent to and in contact with said valve member, and with said sleeve member concurrently disposed such that said first opening of this sleeve member is in communication with said first discharge outlet of said housing, and also such that said second opening of this sleeve member is in communication with said second discharge outlet of said housing, and further such that said first and second openings of this sleeve member are covered and thereby closed when said valve member is in a closed position;
   g. and, means for preventing said rotatable sleeve member from rotating.

4. A liquid fuel valve assembly, as set forth in claim 3, wherein said means for preventing said sleeve member of said liquid fuel valve subassembly means from rotating includes a ball member captured in, and between, a slot in said sleeve member and an opening in said housing.

5. A liquid fuel valve assembly, as set forth in claim 4, wherein said valve member and said sleeve member are made of material which is resistant to rust and to galling.

6. A liquid fuel valve assembly, as set forth in claim 5, wherein said valve member and said sleeve member are made of tungsten carbide.

7. A liquid fuel valve assembly, as set forth in claim 6, wherein said means for biasing said second retainer member toward said first retainer member includes a spring member disposed within said second constituent portion of said housing.

8. A liquid fuel valve assembly, as set forth in claim 7, wherein said second constituent portion of said housing is threadedly engaged with, and thereby is releasably connected to, said first constituent portion of said housing.

9. A liquid fuel valve assembly, as set forth in claim 8, wherein said spring member of said biasing means is coiled around said second retainer member and is disposed between and is in contact with a flange of said second retainer member and an internal surface of said second constituent portion of said housing.

10. A liquid fuel valve assembly, as set forth in claim 9, wherein said first and second constituent portions of said housing each has an outer surface, with said outer surfaces configured such that, when said constituent portions are releasably connected, said surfaces form on said housing a structurally defined area which is weldable, whereby if said surfaces are welded at this area, said housing becomes an integrated one-piece unit.

11. A liquid fuel valve assembly, as set forth in claim 10, wherein said liquid fuel valve subassembly means further includes a filtering screen member disposed in said inlet of said fuel inlet duct.

12. A plurality of identical liquid fuel valve assemblies, as set forth in claim 1, wherein each said liquid fuel valve subassembly means of each of said plurality of identical liquid fuel valve assemblies includes:
   a. a valve member in the shape of a hollow right circular cylinder having a first open end and a second open end, wherein said valve member is disposed adjacent said inlet of said fuel inlet duct and across from said discharge outlets of said first and second discharge ducts, and wherein said valve member is made of tungsten carbide;
   b. a first retainer member having a cavity therein with a surface, with this member disposed over, fitted into, and connected to said second open end of said valve member, thereby closing said end;
   c. a second retainer member having a cavity therein with a surface, with this member disposed such that it is in alignment with said first retainer member and also such that said cavity in this member faces said cavity in said first retainer member;
   d. a rod having a first end and a second end, with said first end disposed in said cavity of said first retainer member and in contact with said surface of this cavity, and with said second end disposed in said cavity of said second retainer member and in contact with said surface of this cavity;
   e. means for biasing said second retainer member toward said first retainer member, with this means disposed within said second constituent portion of its housing;
   f. a rotatable, hollow, cylinder-like sleeve member made of tungsten carbide and having a first opening and a second opening therein, with said sleeve member disposed adjacent to and in contact with said valve member, and with said sleeve member concurrently disposed such that said first opening of this sleeve member is in communication with said first discharge outlet, and also such that said second opening of this sleeve member is in communication with said second discharge outlet, and further such that said first and second openings of this sleeve member are covered and thereby closed when said valve member is in a closed position;
   g. and, means for preventing said sleeve member from rotating.

13. A plurality of identical liquid fuel valve assemblies, as set forth in claim 12, wherein each said means for preventing said sleeve member from rotating includes a ball member captured in, and between, a slot in said sleeve member and an opening in said housing.

14. A plurality of identical liquid fuel valve assemblies, as set forth in claim 13, wherein each said means for biasing said second retainer member toward said first retainer member includes a spring member disposed within said second constituent portion of its housing.

15. A plurality of identical fuel valve assemblies, as set forth in claim 14, wherein said spring member of each said biasing means is coiled around said second retainer member and is disposed between and is in contact with a flange of said second retainer member and an internal surface of said second constituent portion of said housing.

16. A plurality of identical liquid fuel valve assemblies, as set forth in claim 15, wherein said liquid fuel valve subassembly of each said liquid fuel valve assembly further includes a filtering screen member disposed in said inlet of said fuel inlet duct.

* * * * *